US007040091B2

(12) United States Patent
Fan

(10) Patent No.: US 7,040,091 B2
(45) Date of Patent: May 9, 2006

(54) MULTILEVEL SPEED REGULATION JACK

(76) Inventor: Qun Fan, No. 15 Qiaolian Lane, Nongfengliqun Road, Gaomi, Shandong 261500 (CN)

(*) Notice: Subject to any disclaimer, the term of this patent is extended or adjusted under 35 U.S.C. 154(b) by 0 days.

(21) Appl. No.: 10/755,852

(22) Filed: Jan. 12, 2004

(65) Prior Publication Data

US 2004/0226293 A1 Nov. 18, 2004

(30) Foreign Application Priority Data

May 13, 2003 (CN) .......................... 03 2 61824 U

(51) Int. Cl.
*F16D 31/02* (2006.01)

(52) U.S. Cl. .......................................... 60/479; 60/477

(58) Field of Classification Search .................. 60/477, 60/479
See application file for complete search history.

(56) References Cited

U.S. PATENT DOCUMENTS 5,755,099 A 5/1998 Hung
6,199,379 B1 3/2001 Hung
2003/0136125 A1* 7/2003 Hung .......................... 60/479

FOREIGN PATENT DOCUMENTS

CN 99209440.0 4/2000

* cited by examiner

*Primary Examiner*—F. Daniel Lopez
(74) *Attorney, Agent, or Firm*—Alston & Bird LLP

(57) ABSTRACT

A multilevel speed regulation jack includes an input oil cylinder, an output oil cylinder, and a fluid conduit member between the cylinders. The output oil cylinder includes a cylinder body containing an annular space and a tube piston, which fits in the annular space. A sliding sleeve of the tube piston is movably positioned in the annular space. An annular in-flow oil chamber is formed between the end annular surface of the tube piston and the cylinder body, and a central in-flow oil chamber is formed between the inner central surface of the piston and the cylinder body. The fluid conduit member includes at least two parallel fluid channels connected to the central in-flow oil chamber and the annular in-flow oil chamber, respectively. A control valve in one of the fluid channels opens/closes the channel. The jack can automatically switch between different jacking speeds based on the load sensed by the system and therefore has a high jacking efficiency.

4 Claims, 8 Drawing Sheets

A-A

MULTILEVEL SPEED REGULATION JACK

FIELD OF THE INVENTION

The present invention relates to a device that jacks a load to a predetermined height, and more particularly to a multilevel speed regulation jack system.

BACKGROUND OF INVENTION

Hydraulic jacks are common devices used in daily life for jacking a load to a predetermined height with a considerably small force. The working principle of the hydraulic jack is as follows. An applied small force moves an input piston of small cross-sectional area and pushes fluid oil into an output oil cylinder, which then forces an output piston of large cross-sectional area to jack up the load.

According to the law of energy conversion, the path of the input piston is far longer than that of the output piston. Therefore the input piston must be repeatedly pumped to jack a load to a certain height. During the jacking process, each stroke of the input piston moves the output piston the same distance, regardless of the load. Therefore the same number of pumping strokes is needed to jack the load to a certain height, regardless of whether it is a zero load, a small load or a heavy load. The jacking process is slow, as well as time and effort consuming.

For that reason, there is a need for a system to overcome the drawbacks of currently available jacks, such as described above.

SUMMARY OF INVENTION

The present invention is a multilevel speed regulation jack system, which automatically switches between different jacking speeds based on the load signal it senses. The system of the invention can therefore provide increased jacking efficiency.

The present invention includes an input oil cylinder, an output oil cylinder, and a fluid conduit member between the output and input cylinders. The output oil cylinder has a cylinder body containing an annular space and a tube piston, which fits in the annular space. A sliding sleeve of the tube piston is movably positioned in the annular space. An annular in-flow oil chamber is formed between the end annular surface of the tube piston and the cylinder body, and a central in-flow oil chamber is formed between the inner center surface of the piston and the cylinder body. The fluid conduit member includes at least two parallel fluid channels connected to the central in-flow oil chamber and the annular in-flow oil chamber, respectively. There is a control valve in one of the fluid channels, which opens/closes the channel.

The oil cylinder body may have two or more annular spaces and accordingly there may be two or more tube pistons. The two or more tube pistons are movably positioned in their respective annular spaces to form two or more annular in-flow oil chambers.

Further, each of the annular in-flow oil chambers is connected to the input oil cylinder through a parallel fluid channel. Each of the fluid channels has a control valve, which is sequence-programmed and has a preset threshold value. The control valves close/open the fluid channels based on the load signals they sense.

The annular in-flow oil chamber may be singular. The control valve may be in the fluid channel connected to the central in-flow oil chamber or the fluid channel connected to the annular in-flow oil chamber. The system can have at least one input oil cylinder, which is unidirectionally connected to the annular in-flow oil chamber or the central in-flow oil chamber via a fluid channel. The fluid channel can also have a control valve, which is connected to an oil reservoir.

As an alternative, the annular in-flow oil chamber may be singular. The control valve may be in the fluid channel connected to the central in-flow oil chamber or the fluid channel connected to the annular in-flow oil chamber. The two fluid channels can share a common oil path near the input oil cylinder. The oil path has a control valve, which controls the open/close state of the path. The system can have at least one fluid channel, which is parallel to the two fluid channels and is connected to the annular in-flow oil chamber or the central in-flow chamber. The system can have a speed-shifting oil cylinder member that lies in the parallel channel.

The speed-shifting cylinder member has a spring-reset device. The out-flow chamber of the speed-shifting cylinder member is connected to an oil reservoir via a check valve. The speed-shifting cylinder member may include two oil cylinders. The thrust surface of the piston in the primary oil cylinder is smaller than that in the secondary oil cylinder. The primary and the secondary pistons are linked through piston rods. The speed-shifting oil cylinder member may also include comprise of a single oil cylinder, with the piston rod protruding out from the in-flow oil chamber.

The control valve in the fluid channel connected to the annular in-flow oil chamber or the central in-flow chamber may be a sequence valve or check valve. The opening of the check valve is towards the annular in-flow oil chamber or the central in-flow chamber.

The annular in-flow oil chamber and the central in-flow oil chambers in the output oil cylinder may be connected to the oil reservoir via a discharge valve. The annular in-flow oil chamber or the central in-flow oil chamber in the output oil cylinder, if not set to be the first working chamber, may be connected to an oil suction channel.

The input cylinder and the fluid conduit member may be configured into a valve assembly. The output cylinder may be housed in the oil reservoir to form an assembled unit, and the assembled unit and the valve assembly are hermetically coupled.

The following example will illustrate the working principle of the multilevel speed regulation jack system of the present invention. In this case, the output oil cylinder has an annular in-flow oil chamber; a control valve lies in the fluid channel connected to the central in-flow oil chamber; and the input oil cylinder is unidirectionally connected to the annular in-flow oil chamber through a fluid channel which is in parallel to another fluid channel connected to an oil reservoir through a control valve.

With a zero load, pushing down the input piston will pump the oil in the two input cylinders into the annular in-flow oil chamber through their respective fluid channels, and thus moves forward the output piston through its annular thrust surface. The piston rod in the output cylinder jacks up the load at a speed V1. Meanwhile the central in-flow oil chamber sucks fluid oil through the oil suction channel. During this process, two input cylinders pump oil to push the output piston in the output cylinder through a small annular thrust surface. Therefore V1 is the fastest jacking speed of the device.

As the load gradually increases, the pressure in the output cylinder increases correspondingly. The pressure of the oil fluid pumped from the input cylinder also increases. When this pressure reaches the threshold of the control valve in the parallel fluid channel, it opens that parallel channel and the fluid oil flows from the input cylinder to the oil reservoir through that valve. This time the piston rod in the output cylinder jacks up the load at a speed V2. Meanwhile the central in-flow oil chamber sucks oil through the oil suction channel. In this case there is only one input cylinder providing fluid oil to the annular in-flow oil chamber. The jacking speed V2<V1, whereas the load capacity of the jack system is bigger.

As the load further increases, the pressure in the output cylinder continues to increase and the jack system shifts into a high-load range. At the high-load range, the pressure of the fluid oil from the input cylinder exceeds the threshold of the control valve in the channel connected to the central in-flow oil chamber and opens the control valve. Part of the oil from the input cylinder flows through the control valve into the central in-flow oil chamber in the output cylinder. The piston rod in the output cylinder jacks up the load at a speed V3. This time the fluid oil from the input cylinder exerts force on the output piston through both the inner central surface and the end annular surface of the piston. The thrust surface increases and jacking speed decreases, V3<V2. According to the law of energy conversion, the load capacity of the jack system is higher under the same applied pressure.

In the present invention, the system jacks up loads with different speeds based on the loads. This speed switching automatically takes place without any external operation. The jack of the present invention has a higher jacking efficiency and its operation is simple and fast. The system jacks up loads with less force and less time.

In addition, the multilevel speed jack regulation system of the invention may have two or more annular in-flow oil chambers. Each annular in-flow oil chamber can be connected to the input cylinder through a parallel fluid channel. Each parallel channel can have a sequence-programmed and threshold-preset control valve, which opens/closes the channel based on the load it senses. Each addition of an annular in-flow oil chamber adds at least one jacking speed to the system, which makes it a multiple speed jack system. The present invention can alternatively have two or more input cylinders without additional annular oil chambers. Each addition of an input cylinder adds at least one jacking speed to the system, which makes it a multiple speed jack system.

The design of the system can be based on load application. The user can choose the system according to load application. If the load is relatively small, the user can choose a jack system with fewer speed ranges. If the load is big, the user can choose a jack system with more speed ranges. The present invention works at different speeds and different load capacities. At each speed, it works with a particular jacking capacity, as if it was an individual conventional jack of that capacity. The merit of the multiple speed jack system is that only one multiple speed jack is needed to jack up loads of many different weight ranges during operation, instead of switching many conventional jacks of different load capacities. The present invention actually combines many load capacities into one system without a radical departure from the basic structure of a conventional jack. The system also automatically switches its capacity based on the load exerted on it. The present invention provides easier and simpler jacking operations and increases work efficiency and tool utilization.

BRIEF DESCRIPTION OF THE DRAWINGS

Figure 1:
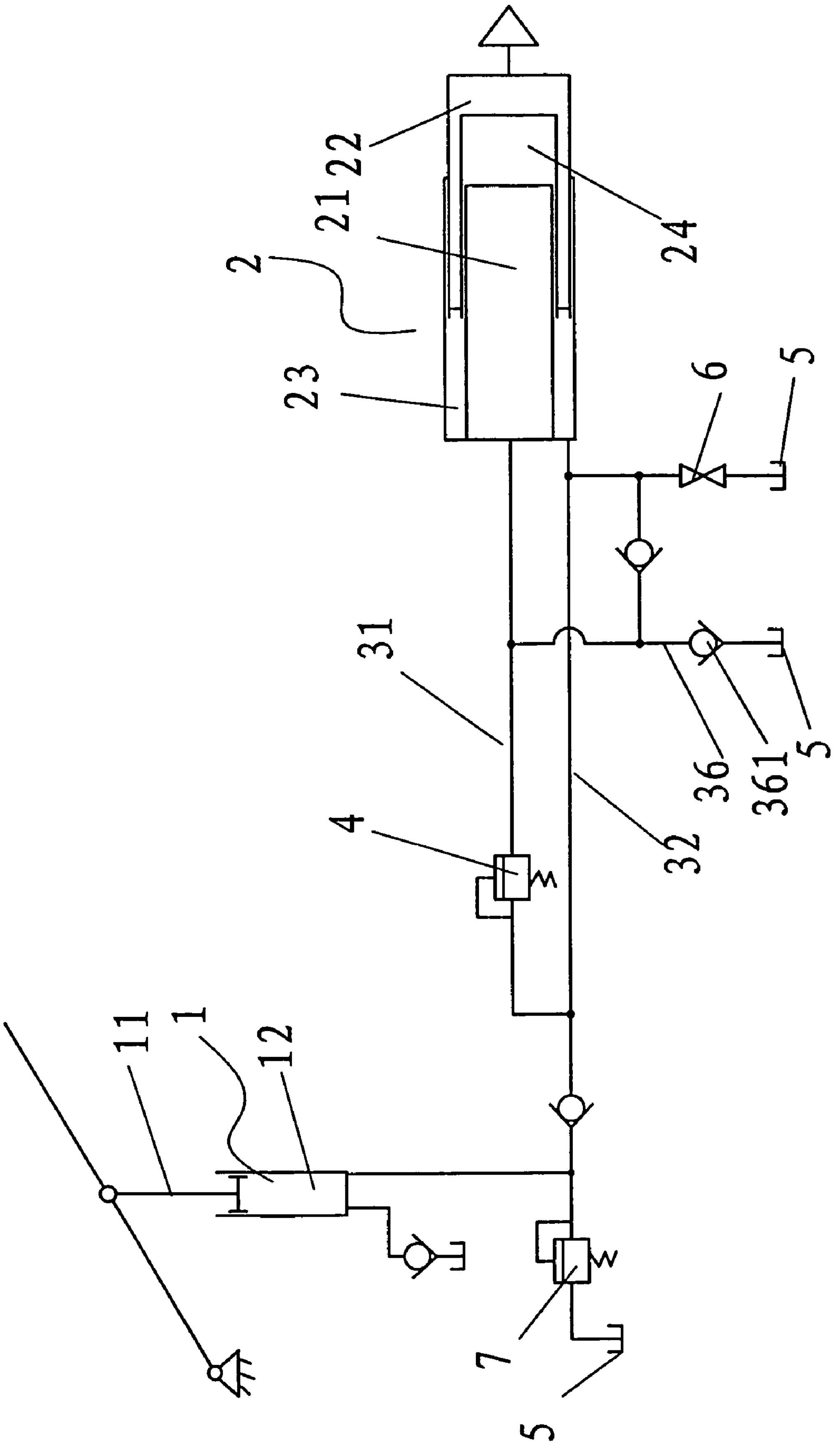

Having thus described the invention in general terms, reference will now be made to the accompanying drawings, which are not necessarily drawn to scale, and wherein:

FIG. 1 is a fluid/pressure diagram of a first embodiment 1 of the present invention.

Figure 2:
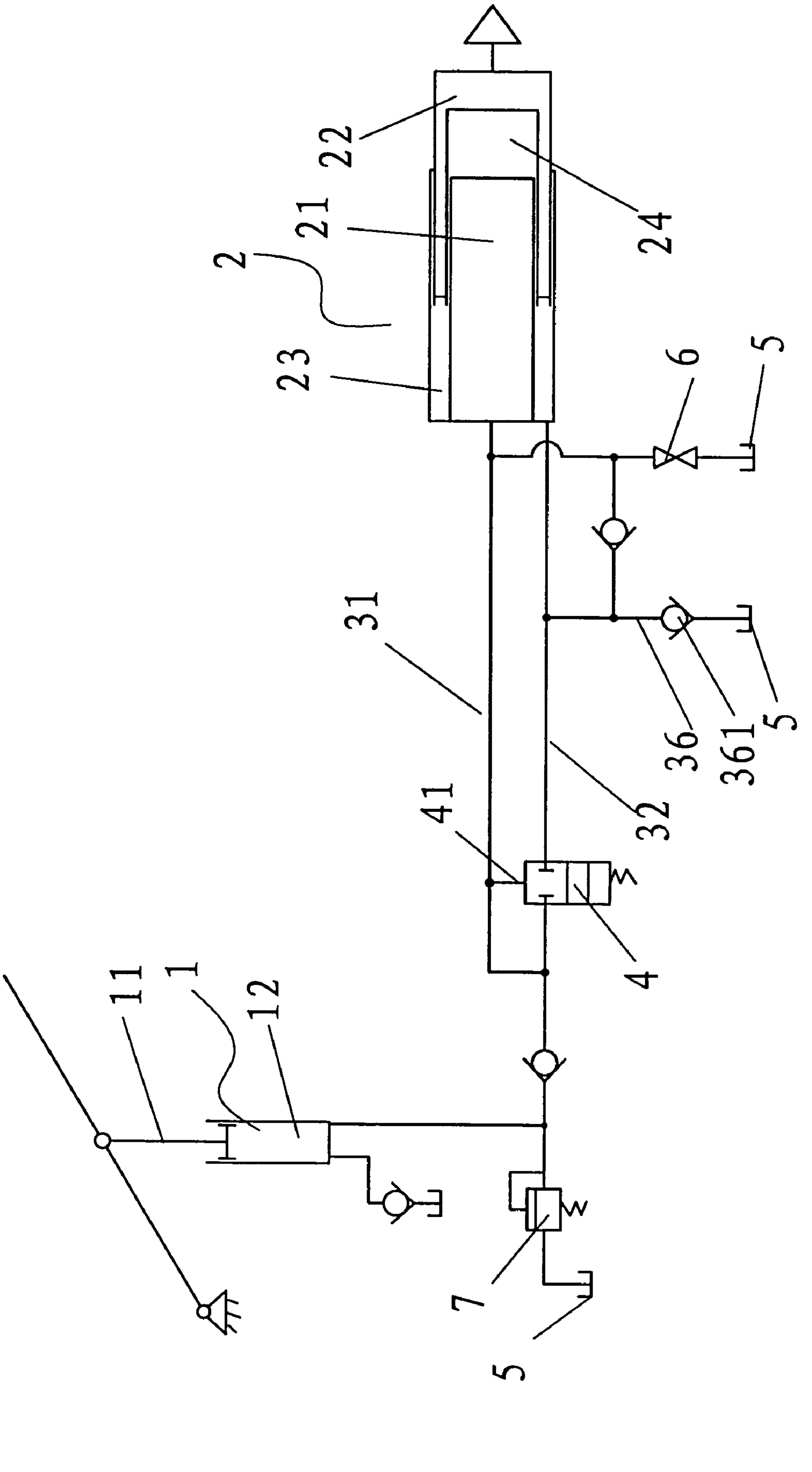

FIG. 2 is an alternative fluid/pressure diagram of first embodiment 1 of the present invention.

Figure 3:
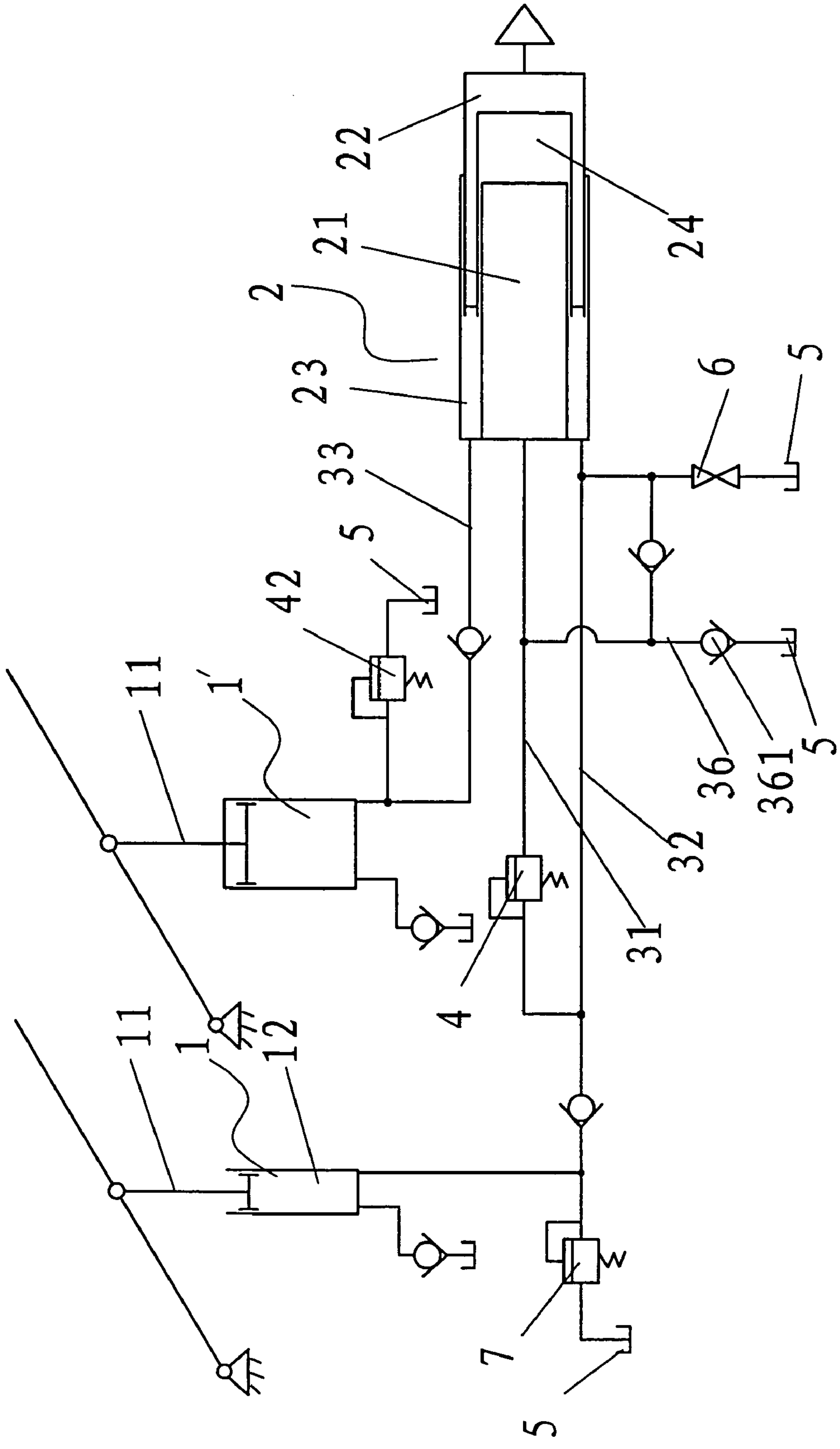

FIG. 3 is a fluid/pressure diagram of a second embodiment 2 of the present invention.

Figure 4:
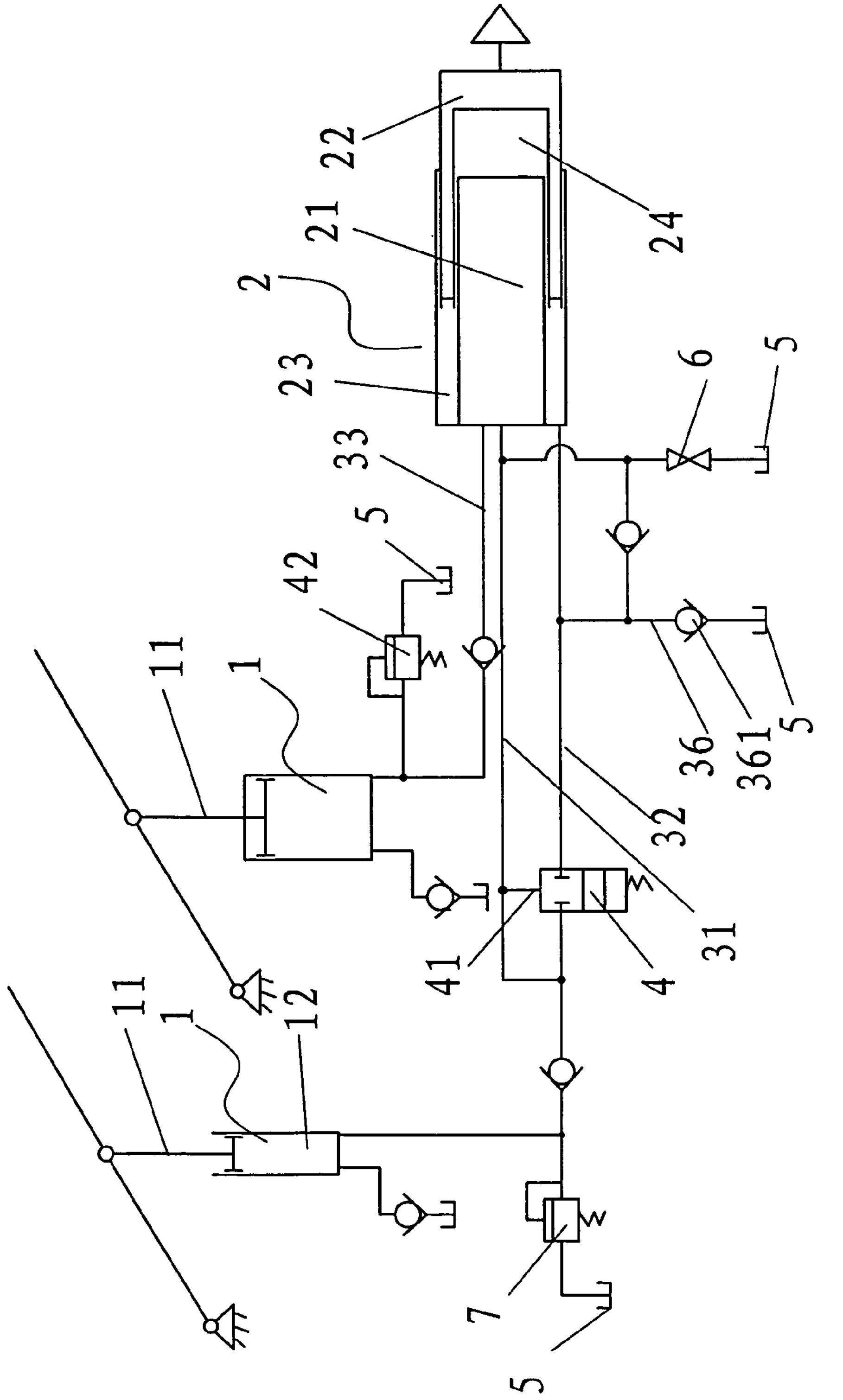

FIG. 4 is an alternative fluid/pressure diagram of second embodiment 2 of the present invention.

Figure 5:
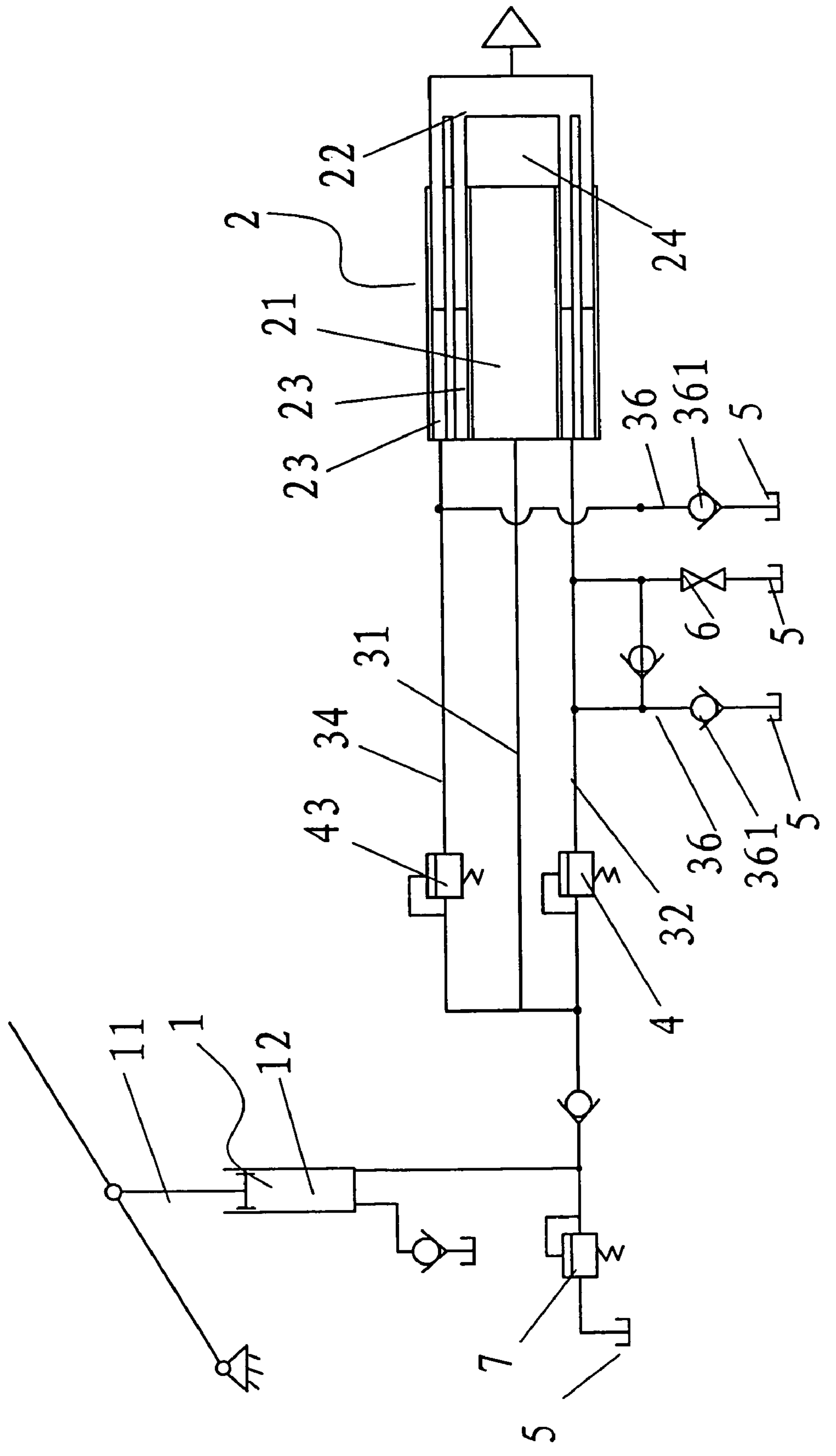

FIG. 5 is a fluid/pressure diagram of a third embodiment 3 of the present invention.

Figure 6:
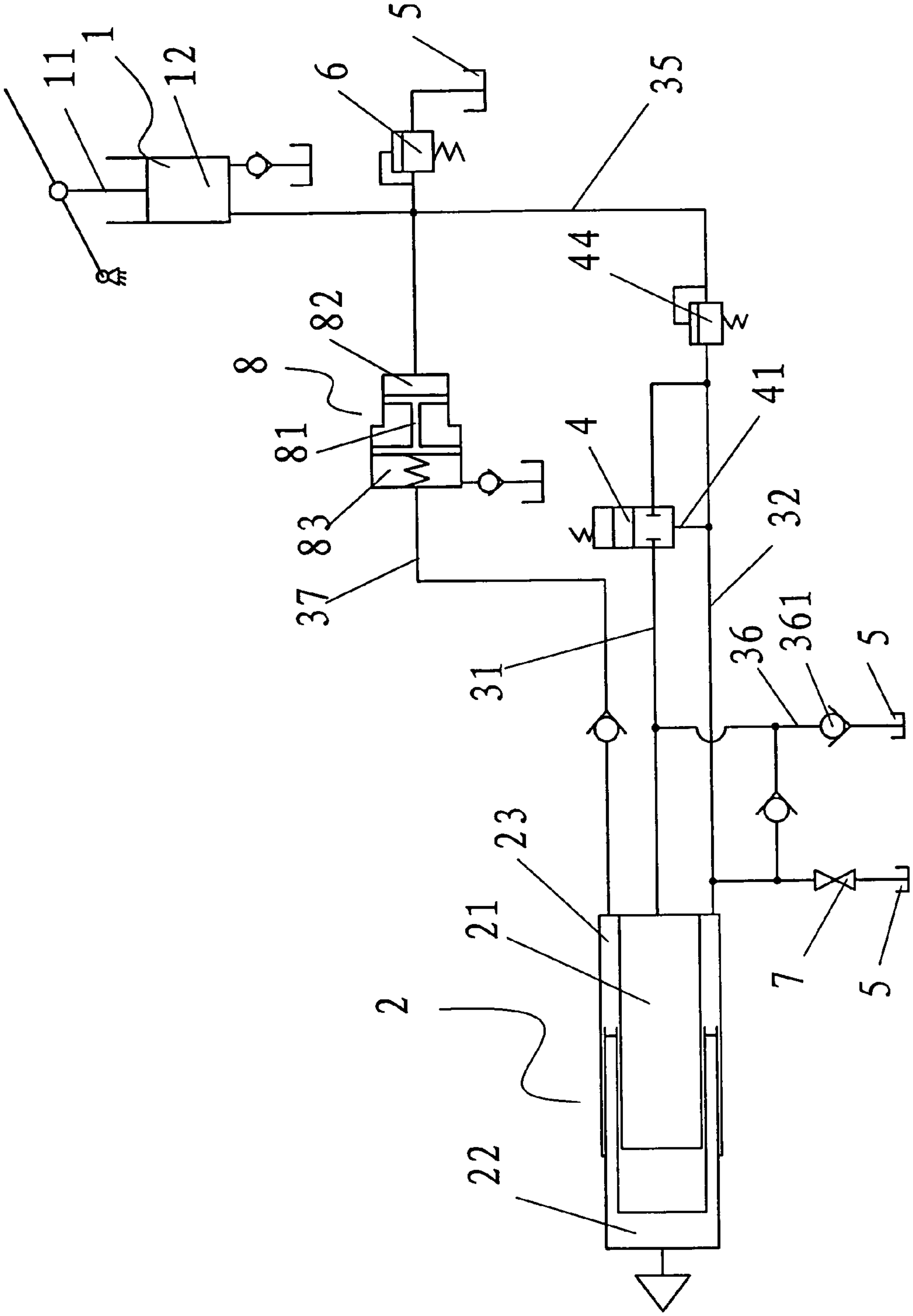

FIG. 6 is a fluid/pressure diagram of a fourth embodiment 4 of the present invention.

Figure 7:
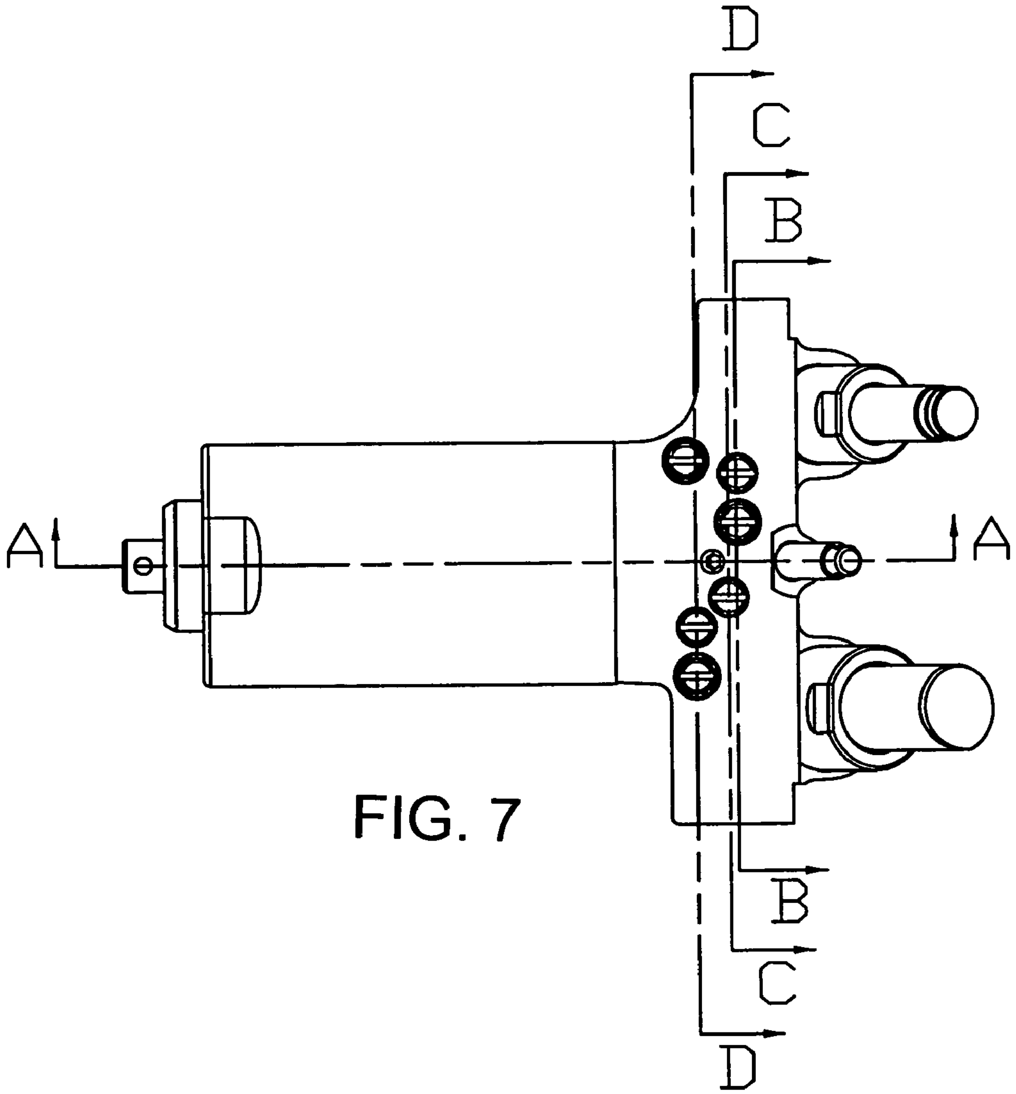

FIG. 7 is a schematic of valve assembly of the present invention.

Figure 7A:
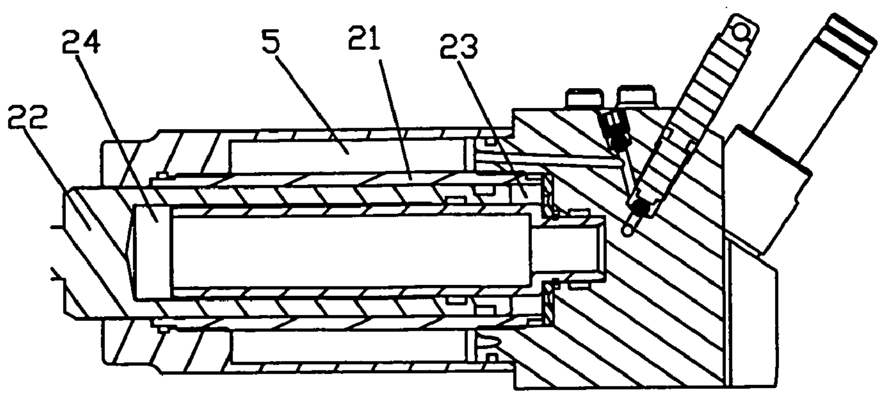

FIG. 7*a* is a sectional view of FIG. 7 taken along line A—A.

Figure 7B:
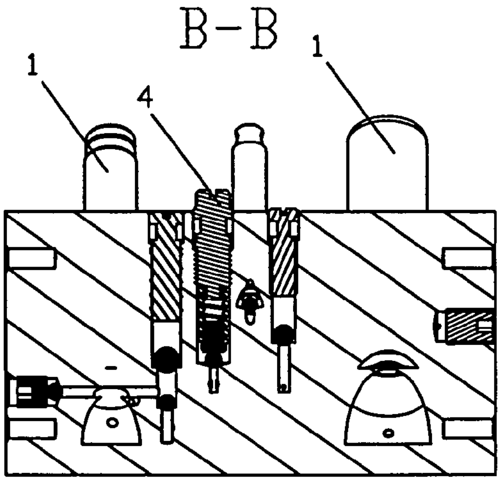

FIG. 7*b* is a sectional view of FIG. 7 taken along line B—B.

Figure 7C:
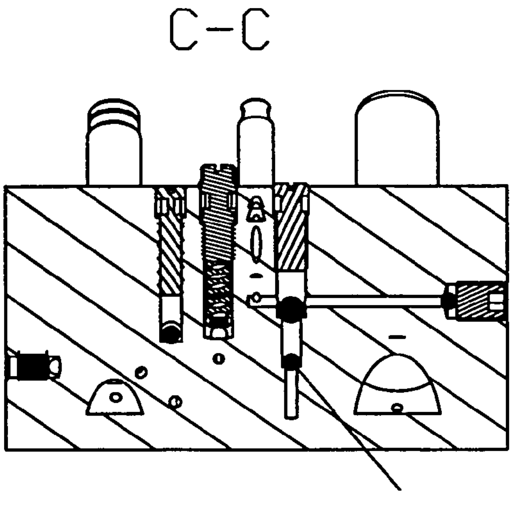

FIG. 7*c* is a sectional view of FIG. 7 taken along line C—C.

Figure 7D:
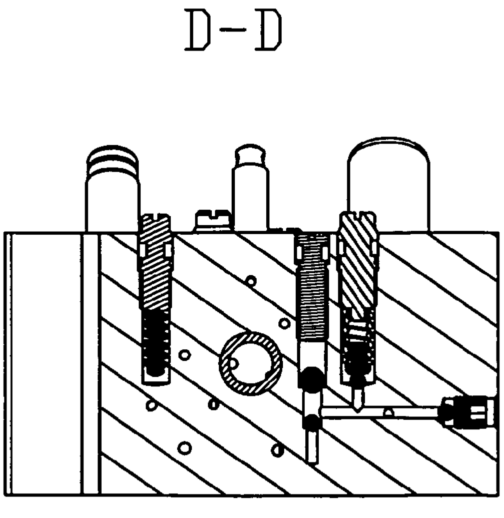

FIG. 7*d* is a sectional view of FIG. 7 taken along line D—D.

DETAILED DESCRIPTION OF THE EMBODIMENTS

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As shown in FIG. 1 through FIG. 6, the multilevel speed regulation jack system of the present invention includes at least an input cylinder 1, an output cylinder 2, and a fluid conduit member connected between input cylinder 1 and output cylinder 2. Output cylinder 2 includes cylinder body 21 containing at least one annular space and tube piston 22 for the annular space. The sliding sleeve of piston 22 is movably positioned in the annular space of cylinder body 21. An annular in-flow oil chamber 23 is formed between the end annular surface of tube piston 22 and cylinder body 21. A central in-flow oil chamber 24 is formed between the inner center surface of piston 22 and cylinder body 21.

The fluid conduit member includes at least two parallel fluid channels 31 and 32 connected to central in-flow oil chamber 24 and annular in-flow oil chamber 23, respectively. Control valve 4 is in one of the fluid channels which opens/closes the channel. During operation, the control valve controls the open/closed state of each fluid channel and therefore adjusts the piston thrust area in output cylinder 2, thus rendering multiple speed functions to the jack system. This multilevel speed regulation jack system automatically switches between different jacking speeds and has a high jacking efficiency.

In the present invention, the number of annular in-flow oil chambers 23 in output cylinder 2 can be one, two or more. Each annular in-flow oil chamber 23 can be connected to input cylinder 1 through a parallel fluid channel, and in each parallel channel a sequence-programmed and threshold-preset control valve can be installed, which opens/closes the channel based on the load it senses. Each addition of an annular in-flow oil chamber 23 adds at least one jacking speed to the system, which makes it a multiple speed jack system.

The present invention can alternatively have two or more input cylinders 1 without additional annular in-flow oil chambers 23. Each addition of an input cylinder 1 adds at least one jacking speed to the system, which makes it a multiple speed jack system.

The design of the system can be based on load application. The user can choose the system according to load application. If the load is relatively small, the user can choose a jack system with fewer speed ranges. If the load is big, the user can choose a jack system with more speed ranges.

The present invention works at different speeds of different load capacities. At each speed, it works with a certain lifting capacity, as if it were an individual conventional jack of that capacity. The merit of the multiple speed jack system is that only one jack is needed to jack up loads of many different weight ranges during the operation, instead of switching many conventional jacks of different load capacities. The present invention actually combines many load capacities into one system without a radical departure from the basic structure of a conventional jack. The present invention also automatically switches its capacity based on the load exerted on it. The present invention makes the jacking operation easier and simpler and increases work efficiency and tool utilization.

The present invention will be further illustrated by the following non-limiting examples.

Embodiment 1

As illustrated in FIG. 1, this embodiment of the present invention has one annular in-flow oil chamber 23. Control valve 4 may be installed in fluid channel 31, which is connected to the central in-flow oil chamber. The control valve controls the connection state of fluid channel 31 based on the load signal it senses. When there is a zero or light load, pressing down piston rod 11 in input cylinder 1 forces the fluid in an out-flow chamber 12 inside input cylinder 1 to flow into annular in-flow chamber 23 via fluid channel 32. The fluid pushes piston 22 in output cylinder 2 through its annular end surface as thrust area at a speed V1. Because the thrust area of piston 22 in output cylinder 2 in this example is small, V1 is large and piston 22 moves fast, and the system has a high jacking efficiency.

As the load increases, the pressure of fluid increases accordingly and eventually it opens control valve 4 in fluid channel 31, and some of the fluid is pumped into central in-flow oil chamber 24. This time piston 22 in output cylinder 2 is moved by the fluid at a speed V2, through the combined thrust area of the annular end surface and the inner central surface. Because this time the thrust area is the whole thrust surface of piston 22, which is larger than the mere annular surface, V2<V1. According to the law of energy conversion, the load capacity of the jack system is higher under the same applied pressure. The system has the capacity to jack up the load, with a small force.

In addition, central in-flow oil chamber 24 may be hooked to fluid suction channel 36, which is connected to oil reservoir 5 via check valve 361. When control valve 4 is closed, the fluid pushes piston 22 only through fluid channel 32, and the space of the central in-flow oil chamber increases. The fluid in oil reservoir 5 is drawn into the central in-flow oil chamber through fluid suction channel 36 and check valve 361, until the chamber is filled. This process facilitates the jacking operation when control valve 4 opens and the inner central area of the piston becomes functioning, and the fluid pressure can be immediately exerted on piston 22.

As illustrated in FIG. 2, an alternative of this embodiment, control valve 4 may be installed in fluid channel 32, which is connected to annular in-flow oil chamber 24. It controls the connection state of fluid channel 32 based on the load signal it senses. With a zero or light load, control valve 4 is closed. Pressing down piston rod 11 in input cylinder 1 forces the fluid in an out-flow chamber 12 inside input cylinder 1 into central in-flow chamber 24 via fluid channel 31. The fluid pushes piston 22 in output cylinder 2 through its inner central surface as thrust area at a speed V1. Because the thrust area of piston 22 in the output cylinder 2 is small, V1 is large and piston 22 moves fast, and the system has a high jacking efficiency.

As the load increases, the pressure of fluid increases accordingly and eventually it opens control valve 4 in fluid channel 32, and some of the fluid is pumped into annular in-flow oil chamber 23. This time piston 22 in output cylinder 2 is moved by the fluid at a speed V2, through the combined thrust area of the annular end surface and the inner central surface. Because this time the thrust area is the whole thrust surface of piston 22, larger than the mere inner central surface, V2<V1. According to the law of energy conversion, the load capacity of the jack system is higher under the same applied pressure. The system has the capacity to jack up the load, with a small force. Similarly, annular in-flow oil chamber 23 may be connected to fluid suction channel 37, resulting in greater efficiency.

In this embodiment of the present invention, control valve 4 may be a sequence valve as shown in FIG. 1, or a check valve as shown in FIG. 2. Opening 41 of the check valve is towards out-flow oil chamber 12 of input cylinder 1. The check valve is normally closed. As the fluid pressure increases with the increasing load, the pressure opens the check valve and the fluid channel, which results in a switch of jacking speed.

As illustrated in FIG. 1 and FIG. 2, in this embodiment of the present invention, annular in-flow oil chamber 23 and central in-flow oil chamber 24 in output cylinder 2 may be connected to oil reservoir 5 via discharge valve 6. Once the jacking is done, the discharge valve is opened and piston 22 in the output cylinder returns to its starting position. Similar to a conventional jack, the multiple speed jack system of the present invention has an overload protection fluid path connected to out-flow oil chamber 12 of input cylinder 1, which leads to oil reservoir 5 via safety valve 7. When the jack is overloaded, safety valve 7 opens and the fluid in input cylinder 1 flows to the oil reservoir through safety valve 7.

Embodiment 2

As illustrated in FIG. 3, in this embodiment of the present invention, output cylinder 2 has one annular in-flow oil chamber 23. Control valve 4 is installed in fluid channel 31 connected to central in-flow oil chamber 24. The system has at least one other input cylinder 1' unidirectionally connected to annular in-flow oil chamber 23 through fluid channel 33. Fluid channel 33 is connected to oil reservoir 5 via control valve 42. The system may have one or more additional input cylinders 1'. Each addition of an input cylinder 1' adds one speed range to the jack system. Using a system of only one additional input cylinder 1' as an example, the working process and principle of speed switching is detailed in the following.

With a zero or light load, by pressing down piston rod 11 in the input cylinder 1, both input cylinders 1 and 1' force fluid oil into annular in-flow oil chamber 23 through fluid channels 32 and 33, respectively. The pressure of the fluid pushes forward piston 22 in output cylinder 2 through its annular thrust surface, at a speed V1. Meanwhile the central in-flow oil chamber draws fluid through fluid suction channel 36. During this process, both input cylinders 1 and 1' push fluid into output cylinder 2 through the small annular thrust area, and V1 is the fastest jacking speed.

As the load increases, the fluid pressure in output cylinder 2 increases accordingly, and so does the pressure of the fluid from input cylinders 1 and 1'. The higher fluid pressure eventually opens control valve 42 in parallel fluid channel 33. The fluid oil in output cylinder 1' flows to oil reservoir 5 through control valve 42. Piston 22 in output cylinder 2 jacks the load at a speed V2. Meanwhile central in-flow oil chamber 24 draws fluid through fluid suction channel 36. This time only input cylinder 1 pushes fluid into annular in-flow oil chamber 23 and V2<V1. However the load capacity of the system is higher.

As the load further increases, the pressure in output cylinder 2 continues to increase and the jack system switches into a high load range. At the high load range, the pressure of the fluid oil from input cylinder 1 exceeds the threshold of control valve 4 in fluid channel 31 connected to central in-flow oil chamber 24 and opens control valve 4. Part of the fluid oil from input cylinder 1 flows through control valve 4 into central in-flow oil chamber 24 in output cylinder 1. Piston 22 in output cylinder 2 jacks up the load at a speed V3. This time the fluid oil from the input cylinder exerts force on output piston 22 through both the inner central surface and the end annular surface of the piston. The thrust area of piston in the output cylinder increases and jacking speed decreases, V3<V2. According to the law of energy conversion, the load capacity of the jack system is higher under the same applied pressure.

In the present invention, the system jacks up loads with different speeds based on the load, and the speed switching automatically takes place without any external operation. The system has a high jacking efficiency, the operation is simple and fast, and it lifts loads with less force and less time.

As illustrated in FIG. 4, an alternative of this embodiment, control valve 4 may be installed in fluid channel 32, which is connected to annular in-flow oil chamber 23. The system has at least another input cylinder 1' unidirectionally connected to central in-flow oil chamber 24 through fluid channel 33. Fluid channel 33 is connected to oil reservoir 5 via control valve 42. Its working process and principle of speed switching are similar to the prior example, and therefore will not be repeated here.

In this embodiment, control valve 4 may be a sequence valve or check valve.

FIG. 7–FIG. **7*d* are the structural drawings of the system represented by the fluid/pressure diagram FIG. 3. Input cylinder 1 and the fluid conduit member may be configured into a valve assembly. Output cylinder 2 may be housed in oil reservoir 5** to form an assembled unit. The assembled unit and the valve assembly are hermetically coupled to form the multiple speed jack system.

Embodiment 3

The basic structure and working principle of this embodiment is similar to those of the embodiment 1, and therefore will not be repeated here.

The difference between this embodiment and the embodiment 1 is illustrated in FIG. 5. Cylinder body 21 of output cylinder 2 may have two or more annular spaces, and piston 22 has correspondingly two or more tube sleeves. Each sliding sleeve is movably positioned in its corresponding annular space to form an individual annular in-flow oil chamber 23. Each annular in-flow oil chamber 23 is connected to input cylinder 1 through a parallel fluid channel. In each fluid channel a sequence-programmed and threshold-preset control valve is installed. The control valve controls the connection state of the fluid channel based on the load signal it senses. Each addition of an annular in-flow oil chamber 23 adds at least one speed range to the system, making it a multiple speed jack system. Using a system of two annular in-flow oil chambers 23 as an example, the working process and principle of speed switching is described in detail in the following.

As illustrated in FIG. 5, the system has two annular in-flow oil chambers 23 and 23'. Annular in-flow oil chamber 23' is connected to input cylinder 1 through fluid channel 34 which has control valve 43 in it. The threshold of control valve 43 is higher than that of control valve 4.

With a zero or light load, control valves 4, 43 are closed. Pressing down piston rod 11 in input cylinder 1 forces the fluid in out-flow oil chamber 12 of input cylinder 1 into central in-flow oil chamber 24 through fluid channel 31. The fluid pushes piston 22 in output cylinder 2 forward at a speed V1, through its inner central surface. Because the thrust area of piston 22 in output cylinder 2 is small, V1 is large and piston 22 moves fast, and the system has a higher jacking efficiency.

As the load increases, the pressure of oil fluid increases accordingly and eventually it opens control valve 4 in fluid channel 32. Some of the fluid in input cylinder 1 is pumped into annular in-flow oil chamber 23. This time piston 22 in output cylinder 2 is moved by the fluid at a speed V2, through the combined thrust area of the annular end surface and the inner central surface of the piston. Because this time the thrust area is the combination of the inner central surface of piston 22 and the end annular surface of in-flow oil chamber 23, larger than the mere inner central surface of piston 22, V2<V1. According to the law of energy conversion, the load capacity of the jack system is higher under the same applied pressure.

As the load further increases, the fluid pressure continues to increase. It eventually opens control valve 43 in fluid channel 34. Some of the fluid in input cylinder 1 is pumped into annular in-flow oil chamber 23'. This time piston 22 in output cylinder 2 is moved by the fluid at a speed V3, through the combined thrust area of the two annular end surfaces and the inner central surface of the piston. Because this time the thrust area consists of all off the thrust surfaces of piston 22, V3<V2. According to the law of energy conversion, the load capacity of the jack system is even higher under the same applied pressure. The system has the capacity to jack up the large load, with a small force.

In the present invention, except central in-flow oil chamber 24 which is set to be the first working in-flow oil chamber, the two annular in-flow oil chambers 23, 23' are connected to fluid suction channel 36. This configuration renders the system a higher jacking efficiency.

Other aspects of this embodiment are similar to those of the embodiment 1 and will not be repeated here.

Embodiment 4

The basic structure and working principle of this embodiment is similar to those of the embodiment 1, and therefore will not be repeated here.

The difference between this embodiment and the embodiment 1 is illustrated in FIG. 6. Fluid channel 31 connected to central in-flow oil chamber 24 and fluid channel 32 connected to annular in-flow oil chamber 23 share a common fluid channel 35 near input cylinder 1. Control valve 44 is installed in common fluid channel 35, which controls the connection state of common fluid channel 35. It has at least one other fluid channel 37 which is in parallel with the aforesaid two fluid channels 31, 32 and is connected to annular in-flow oil chamber 23 or central in-flow oil chamber 24. A speed-shifting cylinder 8 is also in fluid channel 37. Similar to embodiment 1, in this embodiment control valve 4 may be installed in fluid channel 31 connected to central in-flow oil chamber 24, as illustrated in FIG. 1, and fluid channel 37 is connected to annular in-flow oil chamber 23. As a configuration alternative, control valve 4 may also be installed in fluid channel 32 connected to annular in-flow oil chamber 23, and fluid channel 37 will thus be connected to central in-flow oil chamber 24. In the following, the former configuration is used as an example to describe the working process and principle of this embodiment. The later configuration has a similar working process and principle and will not be described.

As illustrated in FIG. 6, control valve 4 is closed when the load is zero or light. Pressing down piston rod 11 in input cylinder 1 forces the fluid in out-flow oil chamber 12 through fluid channel 37, thus pushing forward piston 81 in speed-shifting cylinder 8. Piston 81 in speed-shifting cylinder 8 pushes the fluid into annular in-flow oil chamber 23 at a shifted speed. The fluid pushes forward piston 22 in output cylinder 2 at a speed V1, through the end annular surface of the piston. Because this time the thrust area of piston 22 in the output cylinder is small and the flow velocity is also shifted by speed-shifting cylinder 8, V1 is large and the piston moves fast; and the system has a high jacking efficiency.

As the load increases, the fluid pressure increases correspondingly. The fluid pressure eventually opens control valve 44 in common fluid channel 35 while control valve 4 is still closed. Part of the fluid is pushed into annular in-flow oil chamber 23 through fluid channel 32. The piston jacks up the load at a speed V2. Because this time part of the fluid flows directly into annular in-flow oil chamber 23 through fluid channel 32, without speed adjustment by speed-shifting cylinder 8, V2<V1. According to the law of energy conversion, the load capacity of the jack system is higher under the same applied pressure.

As the load further increases, the fluid pressure continues to increase and eventually opens control valve 4. Some fluid flows into central in-flow oil chamber 24 through fluid channel 31. The fluid pushes forward piston 22 at a speed V3, through the whole thrust surface of piston 22 in output cylinder 2, because of the larger thrust surface, V3<V2. According to the law of energy conversion, the load capacity of the jack system is even higher under the same applied pressure. The system has the capacity to jack up the larger load, with a small force.

In the present invention, speed-shifting cylinder 8 may be of a configuration of any existing cylinder. As illustrated in FIG. 6, speed-shifting cylinder 8 has spring-reset device 84. Out-flow oil chamber 83 in speed-shifting cylinder 8 is connected to oil reservoir 5 through a check valve. Speed-shifting cylinder 8 may consist of two cylinders. The sectional area of the piston in the primary cylinder is smaller than that of the piston in the secondary cylinder. The primary piston and secondary piston are linked through the piston rods. The fluid pushes forward piston 81 through in-flow oil chamber 82 of a small sectional area. Piston 81 then forces the fluid out of an out-flow chamber of a larger sectional area, resulting in the speed shifting. In the present invention, the speed-shifting cylinder may also consist of one single cylinder, with its piston rod extruding out from in-flow oil chamber 82. The piston thrust surface in in-flow oil chamber 82 is the annular surface around the piston rod. While the piston thrust surface in out-flow oil chamber 83 is the whole sectional area of the piston, far larger than the piston thrust surface in in-flow oil chamber 82. This is the principle of speed shifting (not illustrated).

Other aspects of this embodiment are similar to those of embodiment 1 and will not be repeated here.

In the above embodiments, annular in-flow oil chamber 23 and central in-flow oil chamber 24 in the output cylinder may be connected to oil reservoir 5 via a discharge valve, for discharging the fluid. Except the first working in-flow oil chamber, other annular in-flow oil chamber 23 or central in-flow oil chamber 24 in output cylinder 2 may be individually connected to a fluid suction channel, to improve the jacking efficiency.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A multilevel speed regulation jack comprising:
an input oil cylinder;
an output oil cylinder comprising a cylinder body containing an annular space and a tube piston that fits in said annular space, said tube piston comprising a sliding sleeve movably positioned in said annular space;
a fluid conduit member connecting the input and output oil cylinders;
an annular in-flow oil chamber formed between an end annular surface of the tube piston and the cylinder body; and
a central in-flow oil chamber formed between an inner central surface of the tube piston and the cylinder body,
wherein the fluid conduit member comprises at least two parallel fluid channels connected to the central in-flow oil chamber and the annular in-flow oil chamber, respectively; and
a control valve in one of the fluid channels to open and close the channel;
wherein said cylinder body has two or more annular spaces and two or more tube pistons movably positioned in their respective annular space to form two or more annular in-flow oil chambers.

2. The multilevel speed regulation jack of claim 1, wherein:
each of said annular in-flow oil chambers is connected to an input oil cylinder through a parallel fluid channel; and
each of said fluid channels has a control valve, which is sequence-programmed and threshold-preset and close and open the fluid channels based on the load signals they sense.

3. A multilevel speed regulation jack comprising:
an input oil cylinder;
an output oil cylinder comprising a cylinder body containing an annular space and a tube piston that fits in said annular space, said tube piston comprising a sliding sleeve movably positioned in said annular space;

a fluid conduit member connecting the input and output oil cylinders;

an annular in-flow oil chamber formed between an end annular surface of the tube piston and the cylinder body; and a central in-flow oil chamber formed between an inner central surface of the tube piston and the cylinder body, wherein the fluid conduit member comprises at least two parallel fluid channels connected to the central in-flow oil chamber and the annular in-flow oil chamber, respectively; and a control valve in one of the fluid channels to open and close the channel;

wherein:

said annular in-flow oil chamber is singular;

said control valve is in the fluid channel connected to the central in-flow oil chamber or the fluid channel connected to the annular in-flow oil chamber;

the two fluid channels share a common oil path near the input oil cylinder;

the common oil path has a control valve, which controls the open/close state of the path; and said jack further comprises at least one fluid channel, which is parallel to said two fluid channels and is connected to the annular or central in-flow chamber, wherein a speed-shifting cylinder member lies in said parallel channel.

4. The multilevel speed regulation jack of claim 3, wherein:

said speed-shifting cylinder member has a spring-reset device;

the out-flow oil chamber of said speed-shifting cylinder member is connected to an oil reservoir via a check valve;

the speed-shifting cylinder member comprises two oil cylinders, wherein the thrust surface of piston in the primary oil cylinder is smaller than that in the secondary oil cylinder;

the primary and the secondary pistons are linked through piston rods; and said speed-shifting oil cylinder member further comprises a single oil cylinder, wherein the piston rod protrudes out from the in-flow oil chamber.

* * * * *